(12) United States Patent
Wang et al.

(10) Patent No.: US 10,173,545 B2
(45) Date of Patent: Jan. 8, 2019

(54) ELECTRIC VEHICLE AND DISCHARGING APPARATUS THEREOF

(71) Applicants: SHENZHEN BYD AUTO R&D COMPANY LIMITED, Shenzhen (CN); BYD COMPANY LIMITED, Shenzhen (CN)

(72) Inventors: Wei Wang, Shenzhen (CN); Hongjun Wang, Shenzhen (CN); Zhen Li, Shenzhen (CN); Cong Xu, Shenzhen (CN)

(73) Assignees: BYD COMPANY LIMITED, Shenzhen (CN); SHENZHEN BYD AUTO R&D COMPANY LIMITED, Shenzhen (CN)

( * ) Notice: Subject to any disclaimer, the term of this patent is extended or adjusted under 35 U.S.C. 154(b) by 529 days.

(21) Appl. No.: 14/370,044

(22) PCT Filed: Dec. 31, 2012

(86) PCT No.: PCT/CN2012/088098
§ 371 (c)(1),
(2) Date: Jun. 30, 2014

(87) PCT Pub. No.: WO2013/097825
PCT Pub. Date: Jul. 4, 2013

(65) Prior Publication Data
US 2014/0354240 A1 Dec. 4, 2014

(30) Foreign Application Priority Data

Dec. 31, 2011 (CN) .......................... 2011 1 0458395
Dec. 31, 2011 (CN) ...................... 2011 2 0571932 U
(Continued)

(51) Int. Cl.
H02J 7/00 (2006.01)
H02J 7/04 (2006.01)
(Continued)

(52) U.S. Cl.
CPC ............ B60L 11/1851 (2013.01); B60L 1/003 (2013.01); B60L 1/006 (2013.01); B60L 3/003 (2013.01);
(Continued)

(58) Field of Classification Search
CPC .......................... B60L 11/1842; Y02T 10/7077
(Continued)

(56) References Cited

U.S. PATENT DOCUMENTS 4,920,475 A 4/1990 Rippel
5,471,655 A 11/1995 Kivari
(Continued)

FOREIGN PATENT DOCUMENTS

CN 1625014 A 6/2005
CN 1634725 A 7/2005
(Continued)

OTHER PUBLICATIONS

English language abstract for CN1625014A extracted from espacenet.com on Jun. 30, 2015, 1 page.
(Continued)

*Primary Examiner* — David V Henze-Gongola
*Assistant Examiner* — Tarikh Kanem Rankine
(74) *Attorney, Agent, or Firm* — Anova Law Group, PLLC

(57) ABSTRACT

A discharging apparatus for an electric vehicle and an electric vehicle are provided. The discharging apparatus comprises: an AC charging interface, connected with a charging pile and configured to transmit an AC to a power grid via the charging pile; an instrument, configured to send
(Continued)

US 10,173,545 B2

Page 2 a discharging preparation instruction; a controller, configured to detect whether the AC charging interface is connected with the charging pile after receiving the discharging preparation instruction, and to detect whether there is a PWM wave with a predetermined voltage in the controller, and if there is a PWM wave with a predetermined voltage in the controller, to switch to an external discharging mode; a battery manager, configured to control an external discharging circuit in a high-voltage distribution box of the electric vehicle to be connected after the controller switches to the external discharging mode; a power battery, connected with the high-voltage distribution box.

16 Claims, 7 Drawing Sheets

(30) Foreign Application Priority Data

| Jun. 7, 2012 | (CN) | 2012 1 0185660 |
| Jun. 7, 2012 | (CN) | 2012 2 0266009 U |
| Jun. 27, 2012 | (CN) | 2012 1 0214502 |
| Jun. 27, 2012 | (CN) | 2012 2 0303636 U |

(51) Int. Cl.
| B60L 11/18 | (2006.01) |
| H02J 5/00 | (2016.01) |
| H02J 7/02 | (2016.01) |
| H04B 3/54 | (2006.01) |
| B60L 3/00 | (2006.01) |
| B60L 1/00 | (2006.01) |
| H02J 3/32 | (2006.01) |
| H02J 7/34 | (2006.01) |

(52) U.S. Cl.
CPC .......... *B60L 3/0046* (2013.01); *B60L 3/0069* (2013.01); *B60L 11/18* (2013.01); *B60L 11/1803* (2013.01); *B60L 11/1805* (2013.01); *B60L 11/185* (2013.01); *B60L 11/1809* (2013.01); *B60L 11/1811* (2013.01); *B60L 11/1812* (2013.01); *B60L 11/1814* (2013.01); *B60L 11/1816* (2013.01); *B60L 11/1818* (2013.01); *B60L 11/1838* (2013.01); *B60L 11/1842* (2013.01); *B60L 11/1861* (2013.01); *B60L 11/1872* (2013.01); *H02J 3/32* (2013.01); *H02J 5/00* (2013.01); *H02J 7/007* (2013.01); *H02J 7/0036* (2013.01); *H02J 7/0054* (2013.01); *H02J 7/0055* (2013.01); *H02J 7/0063* (2013.01); *H02J 7/0065* (2013.01); *H02J 7/0068* (2013.01); *H02J 7/02* (2013.01); *H02J 7/345* (2013.01); *H04B 3/542* (2013.01); *B60L 2210/12* (2013.01); *B60L 2210/14* (2013.01); *B60L 2210/30* (2013.01); *B60L 2210/40* (2013.01); *B60L 2210/42* (2013.01); *B60L 2230/12* (2013.01); *B60L 2240/527* (2013.01); *B60L 2240/529* (2013.01); *B60L 2240/545* (2013.01); *B60L 2240/547* (2013.01); *B60L 2240/549* (2013.01); *B60L 2250/12* (2013.01); *B60L 2260/22* (2013.01); *B60L 2260/26* (2013.01); *B60L 2270/147* (2013.01); *B60L 2270/20* (2013.01); *H02J 7/022* (2013.01); *H02J 2007/0067* (2013.01); *Y02E 60/721* (2013.01); *Y02T 10/705* (2013.01); *Y02T 10/7005* (2013.01); *Y02T 10/7044* (2013.01); *Y02T 10/7072* (2013.01); *Y02T 10/7088* (2013.01); *Y02T 10/7225* (2013.01); *Y02T 10/7233* (2013.01); *Y02T 10/7241* (2013.01); *Y02T 10/92* (2013.01); *Y02T 90/121* (2013.01); *Y02T 90/127* (2013.01); *Y02T 90/128* (2013.01); *Y02T 90/14* (2013.01); *Y02T 90/16* (2013.01); *Y02T 90/163* (2013.01); *Y02T 90/168* (2013.01); *Y02T 90/169* (2013.01); *Y04S 10/126* (2013.01); *Y04S 30/12* (2013.01); *Y04S 30/14* (2013.01)

(58) Field of Classification Search
USPC .......................................................... 320/109
See application file for complete search history.

(56) References Cited

U.S. PATENT DOCUMENTS

| 5,642,270 | A | * | 6/1997 | Green | B60L 11/126 |
| | | | | | 363/17 |
| 5,994,874 | A | | 11/1999 | Hirose | |
| 6,163,135 | A | | 12/2000 | Nakayama et al. | |
| 6,690,719 | B1 | | 2/2004 | Raphaeli et al. | |
| 7,317,300 | B2 | * | 1/2008 | Sada | G01R 31/3668 |
| | | | | | 320/104 |
| 7,411,362 | B2 | | 8/2008 | Ishikawa | |
| 7,489,106 | B1 | | 2/2009 | Tikhonov | |
| 8,427,103 | B2 | | 4/2013 | Ohtomo | |
| 8,487,582 | B2 | | 7/2013 | King et al. | |
| 8,922,050 | B2 | | 12/2014 | Fassnact | |
| 2003/0197425 | A1 | | 10/2003 | Montante | |
| 2003/0220026 | A1 | | 11/2003 | Oki et al. | |
| 2004/0017175 | A1 | | 1/2004 | Lee et al. | |
| 2004/0026140 | A1 | | 3/2004 | Suzuki et al. | |
| 2004/0062059 | A1 | | 4/2004 | Cheng et al. | |
| 2004/0145338 | A1 | | 7/2004 | Nakamura et al. | |
| 2005/0182535 | A1 | | 8/2005 | Huang | |
| 2005/0231172 | A1 | | 10/2005 | Kato et al. | |
| 2006/0244411 | A1 | * | 11/2006 | Wobben | B60L 11/1811 |
| | | | | | 320/104 |
| 2007/0075661 | A1 | | 4/2007 | Hsu | |
| 2008/0040296 | A1 | * | 2/2008 | Bridges | G01D 4/004 |
| | | | | | 705/412 |
| 2008/0180058 | A1 | | 7/2008 | Patel et al. | |
| 2008/0185999 | A1 | | 8/2008 | Matsukawa et al. | |
| 2009/0066291 | A1 | | 3/2009 | Tien et al. | |
| 2009/0079389 | A1 | | 3/2009 | Ohtomo | |
| 2009/0096424 | A1 | | 4/2009 | Ambrosio et al. | |
| 2009/0184681 | A1 | | 7/2009 | Kuno | |
| 2009/0278405 | A1 | | 11/2009 | Stancu et al. | |
| 2009/0295224 | A1 | | 12/2009 | Kobayashi | |
| 2010/0007306 | A1 | | 1/2010 | Fukui et al. | |
| 2010/0027305 | A1 | | 2/2010 | Oyobe et al. | |
| 2010/0079004 | A1 | | 4/2010 | Keefe | |
| 2010/0091529 | A1 | | 4/2010 | Jakeman et al. | |
| 2010/0096918 | A1 | | 4/2010 | Sawada et al. | |
| 2010/0164287 | A1 | | 7/2010 | Komazawa et al. | |
| 2010/0181829 | A1 | | 7/2010 | Ichikawa et al. | |
| 2010/0214055 | A1 | | 8/2010 | Fuji et al. | |
| 2010/0219794 | A1 | | 9/2010 | Sugimoto et al. | |
| 2010/0244558 | A1 | | 9/2010 | Mitsutani et al. | |
| 2010/0253145 | A1 | * | 10/2010 | King | B60L 1/006 |
| | | | | | 307/46 |
| 2011/0005037 | A1 | | 1/2011 | Kim | |
| 2011/0020174 | A1 | | 1/2011 | Rauschnabel et al. | |
| 2011/0040436 | A1 | | 2/2011 | Yamamoto et al. | |
| 2011/0050174 | A1 | | 3/2011 | King et al. | |
| 2011/0062962 | A1 | | 3/2011 | Wolf et al. | |
| 2011/0084664 | A1 | | 4/2011 | White et al. | |
| 2011/0115425 | A1 | | 5/2011 | Olsson | |
| 2011/0121779 | A1 | * | 5/2011 | Ichikawa | B60L 11/1816 |
| | | | | | 320/109 |
| 2011/0148353 | A1 | | 6/2011 | King et al. | |
| 2011/0193532 | A1 | * | 8/2011 | Iwanaga | B60K 6/445 |
| | | | | | 320/163 |
| 2011/0202219 | A1 | * | 8/2011 | Ishibashi | B60L 11/1809 |
| | | | | | 701/22 |

(56) References Cited

U.S. PATENT DOCUMENTS

| | | | |
|---|---|---|---|
| 2011/0291479 A1* | 12/2011 | Lee | H02J 3/32 307/43 |
| 2012/0153717 A1 | 6/2012 | Obayashi et al. | |
| 2012/0263242 A1 | 10/2012 | Heuer | |
| 2012/0288016 A1 | 11/2012 | Ichikawa | |
| 2012/0299715 A1 | 11/2012 | Ichikawa | |
| 2014/0333262 A1 | 11/2014 | Ochiai | |
| 2014/0354240 A1 | 12/2014 | Wang et al. | |

FOREIGN PATENT DOCUMENTS

| | | |
|---|---|---|
| CN | 200947552 Y | 9/2007 |
| CN | 101388560 A | 3/2009 |
| CN | 201329816 Y | 10/2009 |
| CN | 102025182 A | 4/2010 |
| CN | 201594757 U | 9/2010 |
| CN | 201752075 U | 2/2011 |
| CN | 101997336 A | 3/2011 |
| CN | 201781330 U | 3/2011 |
| CN | 102045086 A | 5/2011 |
| CN | 102055226 A | 5/2011 |
| CN | 201839022 U | 5/2011 |
| CN | 201876820 U | 6/2011 |
| CN | 201877856 U | 6/2011 |
| CN | 102118184 A | 7/2011 |
| CN | 201898359 U | 7/2011 |
| CN | 102185343 A | 9/2011 |
| CN | 102185375 A | 9/2011 |
| CN | 102222928 A | 10/2011 |
| CN | 102416882 A | 4/2012 |
| CN | 202276163 U | 6/2012 |
| CN | 102673422 A | 9/2012 |
| CN | 202435108 U | 9/2012 |
| CN | 202455130 U | 9/2012 |
| CN | 102774284 A | 11/2012 |
| CN | 102882249 A | 1/2013 |
| CN | 102904300 A | 1/2013 |
| EP | 0 985 570 A2 | 3/2000 |
| EP | 1 531 075 A1 | 5/2005 |
| EP | 2 020 726 A2 | 2/2009 |
| EP | 2 039 560 A1 | 3/2009 |
| EP | 2 290 778 A2 | 3/2011 |
| JP | H06141488 A | 5/1994 |
| JP | 2010 178431 A | 8/2010 |
| JP | 2010 252520 A | 11/2010 |
| JP | 2011 083124 A | 4/2011 |
| JP | 2011151717 A | 8/2011 |
| JP | 2011 176959 A | 9/2011 |
| JP | 2011 234470 A | 11/2011 |
| WO | WO 2010 079074 A1 | 7/2010 |
| WO | WO 2011 013388 A2 | 2/2011 |
| WO | WO 2013 097797 A1 | 7/2013 |
| WO | WO 2013 097798 A1 | 7/2013 |
| WO | WO 2013 097801 A1 | 7/2013 |
| WO | WO 2013 097803 A1 | 7/2013 |
| WO | WO 2013 097825 A1 | 7/2013 |

OTHER PUBLICATIONS

English language abstract for CN200947552Y extracted from espacenet.com on Jun. 30, 2015, 1 page.

English language abstract for CN202455130U extracted from espacenet.com on Jun. 30, 2015, 1 page.

English language abstract and machine-assisted English language translation of JP H06141488 A extracted from www.espacenet.com on Aug. 9, 2016; 8 pages.

English language abstract only of EP 0 985 570 A2 extracted from www.espacenet.com on Aug. 9, 2016; see English language equivalent U.S. Pat. No. 6,163,135 A; 2 pages.

English language abstract only of EP 1 531 075 A1 extracted from www.espacenet.com on Aug. 9, 2016; see English language equivalent U.S. Pat. No. 7,411,362 B2; 2 pages.

English language abstract only of CN 1634725 A extracted from www.espacenet.com on Aug. 10, 2016; 1 pages.

English language abstract and machine-assisted English language translation of EP 2 020 726 A2 extracted from www.espacenet.com on Aug. 9, 2016; 21 pages.

English language abstract only of CN 101388560 A extracted from www.espacenet.com on Jun. 30, 2015; 1 pages.

English language abstract only of EP 2 039 560 A1 extracted from www.espacenet.com on Aug. 9, 2016; see English language equivalent U.S. Pat. No. 8,427,103 B2; 1 pages.

English language abstract only of CN 201329816 Y extracted from www.espacenet.com on Jun. 30, 2015; 1 pages.

English language abstract only of CN 102025182 A extracted from www.espacenet.com on Jun. 30, 2015; 1 pages.

English language abstract only of WO 2010/079074 A1 extracted from www.espacenet.com on Aug. 10, 2016; see English language equivalent U.S. Pat. No. 8,922,050 B2; 1 pages.

English language abstract and machine-assisted English language translation of JP 2010 178431 A extracted from www.espacenet.com on Aug. 9, 2016; 14 pages.

English language abstract and machine-assisted English language translation of CN 1201594757 U extracted from www.espacenet.com on Jun. 3, 2016; 8 pages.

English language abstract and machine-assisted English language translation of JP 2010 252520 A extracted from www.espacenet.com on Aug. 9, 2016; 12 pages.

English language abstract and machine-assisted English language translation of CN 201752075 U extracted from www.espacenet.com on Jun. 3, 2016; 11 pages.

English language abstract only of EP 2 290 778 A2 extracted from www.espacenet.com on Aug. 10, 2016; see English language equivalent U.S. Pat. No. 8,487,582 B2; 2 pages.

English language abstract and machine-assisted English language translation of CN 101997336 A extracted from www.espacenet.com on Aug. 9, 2016; 10 pages.

English language abstract and machine-assisted English language translation of CN 201781330 U extracted from www.espacenet.com on Aug. 10, 2016; 8 pages.

English language abstract and machine-assisted English language translation of JP 2011 083124 A extracted from www.espacenet.com on Aug. 9, 2016; 9 pages.

English language abstract and machine-assisted English language translation of CN 102045086 A extracted from www.espacenet.com on Aug. 9, 2016; 5 pages.

English language abstract and machine-assisted English language translation of CN 102055226 A extracted from www.espacenet.com on Aug. 22, 2016; 12 pages.

English language abstract and machine-assisted English language translation of CN 201839022 U extracted from www.espacenet.com on Aug. 10, 2016; 7 pages.

English language abstract and machine-assisted English language translation of CN 201876820 U extracted from www.espacenet.com on Aug. 10, 2016; 4 pages.

English language abstract and machine-assisted English language translation of CN 201877856 U extracted from www.espacenet.com on Aug. 10, 2016; 8 pages.

English language abstract and machine-assisted English language translation of CN 102118184 A extracted from www.espacenet.com on Aug. 9, 2016; 7 pages.

English language abstract and machine-assisted English language translation of CN 201898359 U extracted from www.espacenet.com on Aug. 10, 2016; 4 pages.

English language abstract and machine-assisted English language translation of JP 2011 176959 A extracted from www.espacenet.com on Aug. 9, 2016; 12 pages.

English language abstract and machine-assisted English language translation of Cn 102185343 a extracted from www.espacenet.com on Aug. 9, 2016; 8 pages.

English language abstract and machine-assisted English language translation of Cn 102185375 a extracted from www.espacenet.com on Aug. 9, 2016; 10 pages.

(56) References Cited

OTHER PUBLICATIONS

English language abstract and machine-assisted English language translation of CN 102222928 A extracted from www.espacenet.com on Aug. 9, 2016; 12 pages.
English language abstract and machine-assisted English language translation of JP 2011 234470 A extracted from www.espacenet.com on Jun. 3, 2016; 15 pages.
English language abstract and machine-assisted English language translation of CN 102416882 A extracted from www.espacenet.com on Jun. 3, 2016; 5 pages.
English language abstract and machine-assisted English language translation of CN 202276163 U extracted from www.espacenet.com on Aug. 10, 2016; 8 pages.
English language abstract only of CN 202435108 U extracted from www.espacenet.com on Jun. 30, 2015; 1 pages.
English language abstract and machine-assisted English language translation of CN 102673422 A extracted from www.espacenet.com on Aug. 9, 2016; 10 pages.
English language abstract and machine-assisted English language translation of CN 102774284 A extracted from www.espacenet.com on Aug. 9, 2016; 15 pages.
English language abstract and machine-assisted English language translation of CN 102882249 A extracted from www.espacenet.com on Aug. 9, 2016; 12 pages.
English language abstract and machine-assisted English language translation of CN 102904300 A extracted from www.espacenet.com on Aug. 9, 2016; 12 pages.
International Search Report of WO 2013 097797 A1 dated Mar. 14, 2013; 2 pages.
International Search Report of WO 2013 097798 A1 dated Mar. 14, 2013; 2 pages.
International Search Report of WO 2013 097801 A1 dated Mar. 22, 2013; 3 pages.
Supplementary European Search Report for Application No. EP 12 86 1486 dated Nov. 17, 2015; 10 pages.
International Search Report of WO 2013 097803 A1 dated Mar. 20, 2013; 3 pages.
International Search Report of WO 2013 097825 A1 dated Mar. 20, 2013; 3 pages.
Christian Lewandowski et al. "Performance Evaluation of PLC over the IEC 61851 Control Pilot Signal", Communication Networks Institute, TU Dortmund University, Dortmund, Germany. pp. 1-3.

* cited by examiner

ELECTRIC VEHICLE AND DISCHARGING APPARATUS THEREOF

CROSS-REFERENCE TO RELATED APPLICATION

This U.S. application claims priority under 35 U.S.C 371 to, and is a U.S. National Phase application of, the International Patent Application No. PCT/CN2012/088098, filed Dec. 31, 2012, which claims the benefit of prior Chinese Application No. 201110458395.6 filed Dec. 31, 2011, No. 201120571932.3 filed Dec 31, 2011, No. 201210185660.2 filed Jun. 7, 2012, No. 201220266009.3 filed Jun. 7, 2012, No. 201220303636.X filed Jun. 27, 2012 and No. 201210214502.5 filed Jun. 27, 2012. The entire contents of the above-mentioned patent applications are incorporated by reference as part of the disclosure of this U.S. application.

FIELD

The present disclosure relates to a vehicle control technology field, and more particularly to an electric vehicle and a discharging apparatus thereof

BACKGROUND

With the development of science and technology, fuel vehicles are being replaced by environment friendly and energy saving electric vehicles. However, the popularization of the electric vehicles encounters some problems, among which high driving mileage and fast charging technology has become major problems in the promotion of electric vehicles.

Currently, large-capacity batteries are used in most electric vehicles. However, although these batteries may enhance the endurance time of the electric vehicle, they make a charging time too long. Although a specialized DC (direct current) charging station may charge a battery quickly, problems such as high cost and large occupied area make the popularity of such an infrastructure encounter a certain difficulty. Moreover, because of a limited space of an electric vehicle, an in-vehicle charger may not satisfy the requirement of a charging power due to the limitation of its volume.

A charging solution currently used in the market comprises the following solutions.

Solution (1)

As shown in FIGS. 1-2, an in-vehicle charging or discharging device in this solution mainly includes a three-phase power transformer 1', a three-phase bridge circuit 2' consisting of six thyristor elements, a constant-voltage control device AUR, and a constant-current control device ACR. However, this solution causes a serious waste of space and cost.

Solution (2)

As shown in FIG. 3, an in-vehicle charging or discharging device in this solution includes two charging sockets 15', 16' to adapt to the single-phase/three-phase charging, which increases the cost. A motor driving loop includes a filtering module consisting of an inductor L1' and a capacitor C1'. When a motor is driven, a loss of a three-phase current is generated when it flows through the filtering module, which causes a waste of an electric quantity of a battery. With this solution, during the charging or discharging operation, an inverter 13' rectifies/inverts an AC (alternating current) electricity, and the voltage after the rectifying/inverting may not be adjusted, such that an operation voltage range of the battery is narrow.

Therefore, most AC charging technologies currently used in the market are a single-phase charging technology, which has disadvantages including low charging power, long charging time, large hardware volume, single function, restriction by voltage levels of different regional grids, etc.

In addition, the electric vehicle only supplies the electric energy stored in the power battery to the motor so that the motor drive electric vehicles to move. While the electric vehicle is in OK gear, after the electric vehicle collects the gear signal and the throttle signal, the motor driving controller inverts DC supplied by the battery into AC and outputs the AC to the motor. Then the motor rotates to drive the electric vehicle.

Most power energy generated during nights or other power consumption low-peak time may be wasted because of no special large-scale energy storage equipment. The power battery with large capacity and good quality is mounted in the electric vehicle as an energy storage device. The energy of the power battery is merely supplied to the electric vehicle, which limits uses of the power battery.

SUMMARY

Embodiments of the present disclosure seek to solve at least one of the problems existing in the related art to at least some extent.

Accordingly, a first object of the present disclosure is to provide a discharging apparatus for an electric vehicle. With the electric vehicle, redundant power energy is stored during power consumption low-peak time and is discharged to a power grid during power consumption high-peak time. The discharging apparatus for an electric vehicle according to embodiments of the present disclosure has advantages of simplicity, high efficiency and applicability. A second object of the present disclosure is to provide an electric vehicle.

In order to achieve the above objects, embodiments of a first aspect of the present disclosure provide a discharging apparatus for an electric vehicle. The discharging apparatus for an electric vehicle includes: an AC charging interface, connected with a charging pile and configured to transmit an AC to a power grid via the charging pile, the charging pile being connected with the power grid; an instrument, configured to send a discharging preparation instruction after receiving a trigger signal; a controller, configured to communicate with the instrument and to detect whether the AC charging interface is connected with the charging pile after receiving the discharging preparation instruction, and to detect whether there is a PWM wave with a predetermined voltage in the controller, and if yes, to switch to an external discharging mode; a battery manager, configured to communicate with the controller and to control an external discharging circuit in a high-voltage distribution box of the electric vehicle to be connected after the controller switches to the external discharging mode; a power battery, connected with the high-voltage distribution box; wherein the controller is configured to detect whether an electric quantity of the electric vehicle is greater than a predetermined value, and if yes, to convert a DC provided by the external discharging circuit into the AC and to output the AC to the AC charging interface so as to discharge to the power grid.

With the discharging apparatus for the electric vehicle according to embodiments of the present disclosure, when the electric vehicle is in OK gear, after an external discharging mode is set in the instrument and the electric vehicle is connected to the charging pile, the electric vehicle may discharge to the power grid if a self-test of the electric vehicle shows the electric vehicle has no fault. With the electric vehicle, redundant power energy is stored during power consumption low-peak time and is discharged to the power grid during power consumption high-peak time. The discharging apparatus for an electric vehicle according to embodiments of the present disclosure has advantages of simplicity, high efficiency and applicability.

Embodiments of a second aspect of the present disclosure provide an electric vehicle. The electric vehicle includes the discharging apparatus for an electric vehicle according to the first aspect of the present disclosure.

With the electric vehicle according to embodiments of the present disclosure, when the electric vehicle is in OK gear, after an external discharging mode is set in the instrument and the electric vehicle is connected to the charging pile, the electric vehicle may discharge to the power grid if a self-test of the electric vehicle shows the electric vehicle has no fault. With the electric vehicle, redundant power energy is stored during power consumption low-peak time and is discharged to the power grid during power consumption high-peak time. The discharging apparatus for an electric vehicle according to embodiments of the present disclosure has advantages of simplicity, high efficiency and applicability.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
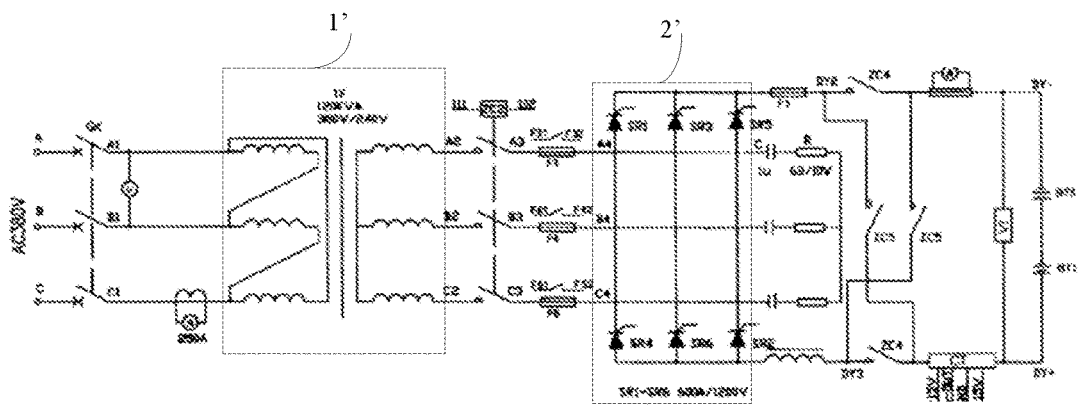
FIG. 1 is a circuit diagram of a conventional in-vehicle charging-discharging device.
Figure 2:
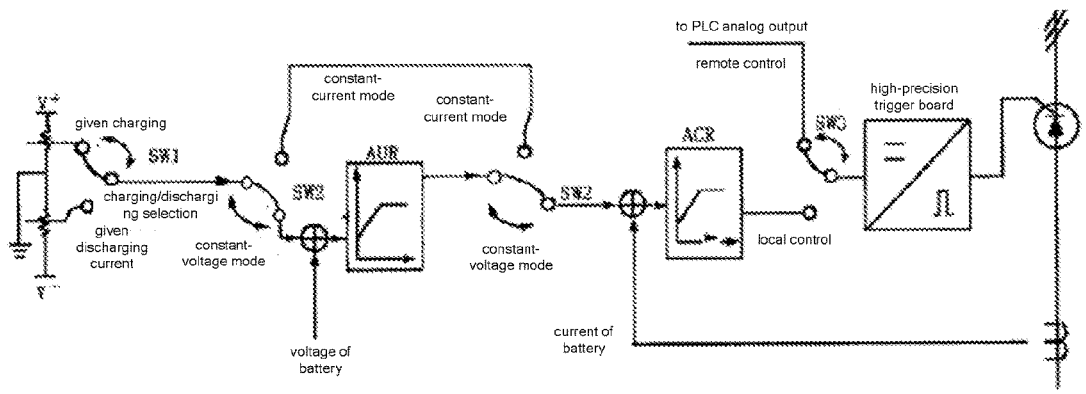
FIG. 2 is a diagram of a conventional in-vehicle charging-discharging device.
Figure 3:
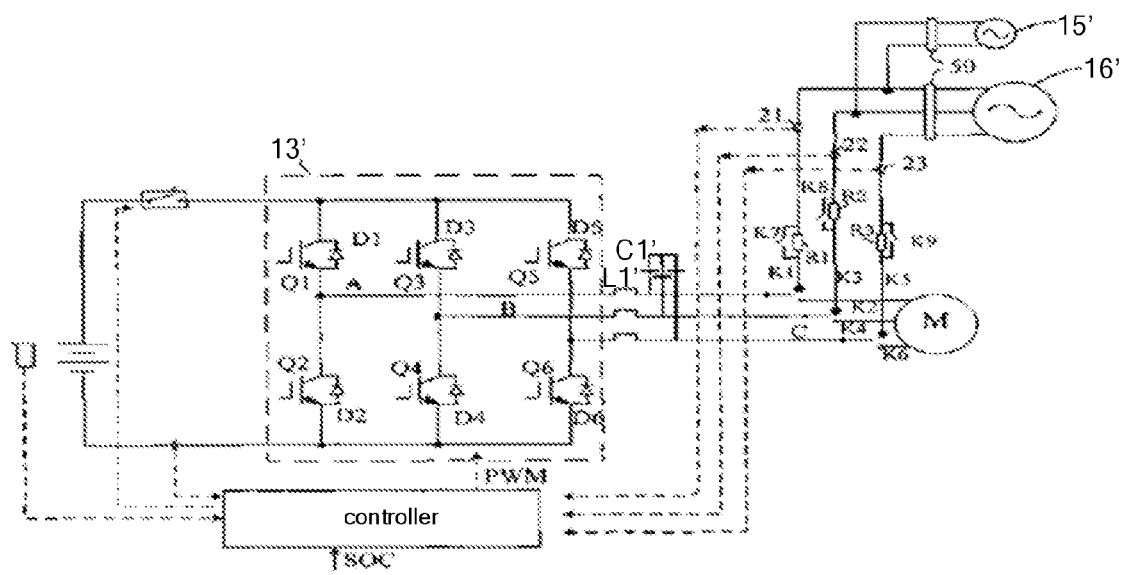
FIG. 3 is a circuit diagram of another conventional in-vehicle charging-discharging device.

Reference will be made in detail to embodiments of the present disclosure. The same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

In the specification, it should be understood that, the terms such as "central", "longitudinal", "lateral", "width", "thickness", "above", "below", "front", "rear", "right", "left", "vertical", "horizontal", "top", "bottom", "inner", "outer", "clockwise", "counter-clockwise" should be construed to refer to the orientation as then described or as shown in the drawings. These terms are merely for convenience and concision of description and do not alone indicate or imply that the device or element referred to must have a particular orientation. Thus, it cannot be understood to limit the present disclosure.

In addition, terms such as "first" and "second" are used herein for purposes of description and are not intended to indicate or imply relative importance or significance or impliedly indicate quantity of the technical feature referred to. Thus, the feature defined with "first" and "second" may comprise one or more this feature. In the description of the present disclosure, "a plurality of" means two or more than two features, unless specified otherwise.

In the present invention, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

In the present invention, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Figure 4:
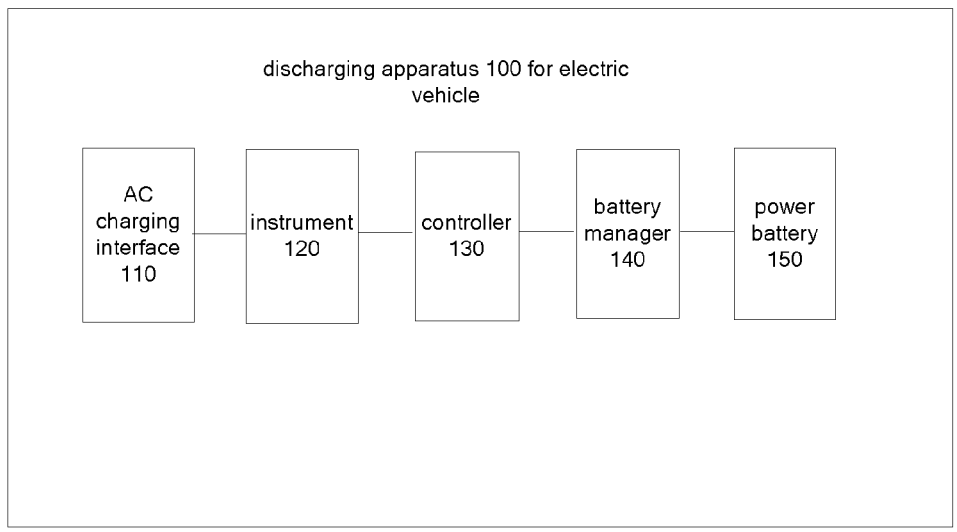
FIG. 4 is a block diagram of a discharging apparatus for an electric vehicle according to an embodiment of the present disclosure.

FIG. 4 is a block diagram of a discharging apparatus for an electric vehicle according to an embodiment of the present disclosure.

As shown in FIG. 4, a discharging apparatus 100 for an electric vehicle according to an embodiment of the present disclosure includes: an AC charging interface 110, an instrument 120, a controller 130, a battery manager 140 and a power battery 150.

The controller 130 is configured to communicate with the instrument 120 and to detect whether the AC charging interface 110 is connected with a charging pile after receiving a discharging preparation instruction sent from the instrument 120 when the instrument 120 receives a trigger signal. The AC charging interface is connected with the charging pile, and the charging pile is connected with a power grid. The AC charging interface is configured to transmit an AC to the power grid via the charging pile. The controller 130 is configured to detect whether there is a PWM wave with a predetermined voltage in the controller, and if yes, the controller 130 switches to an external discharging mode. In one embodiment of the present disclosure, the discharge may be a three-phase discharge or a single-phase discharge.

Specifically, the instrument 120 and the controller 130 are communicated via a CAN bus of a local area network of the controller 130, and the controller 130 and the battery manager 140 are communicated via the CAN bus.

Furthermore, the controller 130 is further configured to determine whether the electric vehicle is currently in P gear after it is determined that the AC charging interface 110 is connected with the charging pile, and if yes, the controller 130 switches to the external discharging mode. The controller 130 is further configured to detect in real-time whether an internal circuit of the controller 130 has a fault and to detect in real-time whether the electric vehicle has a fault during discharging. The controller 130 is further configured to stop outputting the AC if it is determined that the internal circuit of the controller has a fault and/or the electric vehicle has a fault. The controller 130 is further configured to stop outputting the AC after receiving a discharging finish instruction from the instrument 120. The controller 130 is further configured to detect a current discharging current in real-time. The controller 130 is further configured to stop outputting the AC if it is determined that the charging pile is disconnected with the AC charging interface or the charging pile is disconnected with the power grid. The AC may be 380V/50 Hz, or 400V/50 Hz (Europe), or 480V/60 Hz (US.).

The battery manager 140 is configured to communicate with the controller 130 and to control an external discharging circuit in a high-voltage distribution box of the electric vehicle to be connected after the controller 130 switches to the external discharging mode.

Specifically, the battery manager 140 is further configured to detect in real-time a current electric quantity of the power battery and whether the power battery 150 has a fault, if it is determined that the power battery 150 has a fault, the battery manager 140 sends a battery fault instruction to the controller 130, and the controller 130 stops outputting the AC after receiving the battery fault instruction.

The power battery 150 is connected with the high-voltage distribution box and is configured to provide a DC.

The controller 130 is configured to detect whether an electric quantity of the electric vehicle is greater than a predetermined value, and if yes, to convert a DC provided by the external discharging circuit into the AC and to output the AC to the AC charging interface 110 so as to discharge to the power grid.

With the discharging apparatus for the electric vehicle according to embodiments of the present disclosure, when the electric vehicle is in OK gear, after an external discharging mode is set in the instrument and the electric vehicle is connected to the charging pile, the electric vehicle may discharge to the power grid if a self-test of the electric vehicle shows the electric vehicle has no fault. With the electric vehicle, redundant power energy is stored during power consumption low-peak time and is discharged to the power grid during power consumption high-peak time. The discharging apparatus for an electric vehicle according to embodiments of the present disclosure has advantages of simplicity, high efficiency and applicability.

Figure 5:
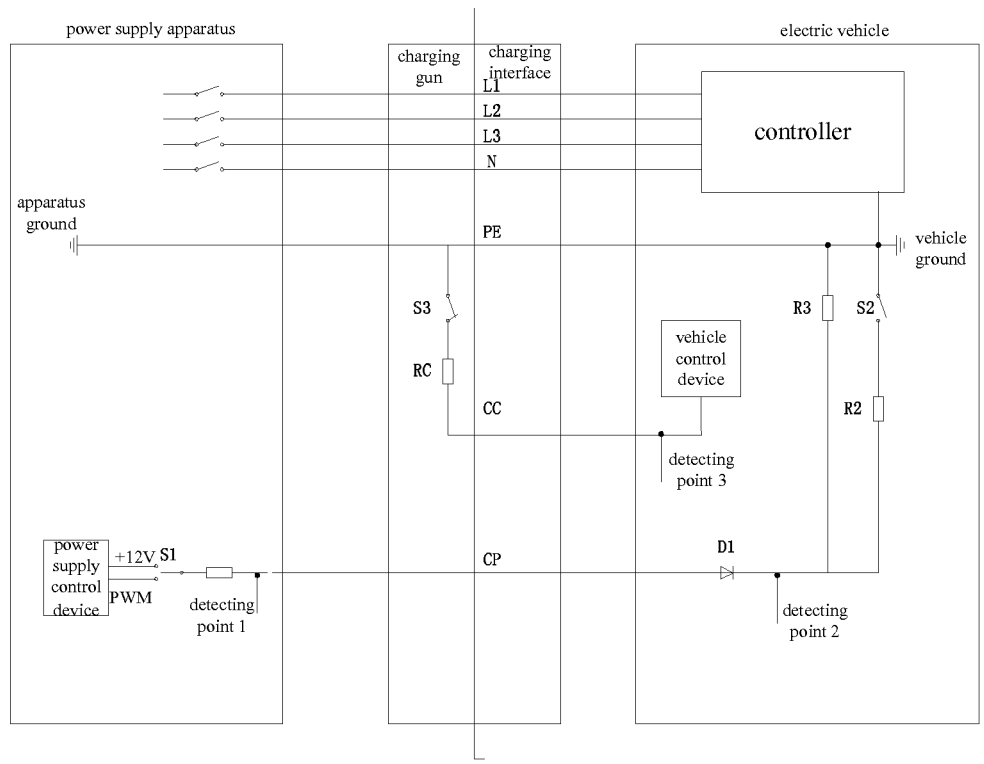
FIG. 5 is a connecting topological diagram showing an electric vehicle discharging to a power grid.

FIG. 5 is a connecting topological diagram showing an electric vehicle discharging to a power grid.

As shown in FIG. 5, the connecting topological diagram showing an electric vehicle discharging to a power grid includes: a controller, a vehicle control device, a charging gun and a charging interface connected with the charging gun, and a power supply control device.

Specifically, during the V-to-G discharging, at least the following modules are involved into operation: the instrument, the battery manager, the high-voltage distribution box, the controller, the AC charging interface, and the power battery. The instrument is configured to sample a discharging switch signal and a discharging mode signal, and to display discharging information and fault information. The battery manager is configured to sample state information of the power battery, to determine whether the power battery is allowed to externally discharge, and to control to connect a power supply circuit in the high-voltage distribution box. The high-voltage distribution box is configured to connect the power battery and the controller, such that the power battery may supply DC to the controller. The controller is configured to receive PWM wave, to detect in real-time whether the controller is connected with the charging pile, and to invert the DC supplied by the power battery into an AC for outputting to the power grid. The AC charging interface is configured to connect with the charging pile, thus connecting the electric vehicle with the charging pile. The power battery is configured to store electric energy and to externally discharge the stored electric energy if it is required.

Further, during the V-to-G discharging, the charging pile is required to perform the discharging. When the electric vehicle discharges externally, it is required to be in OK gear, and after the external discharging mode is set in the instrument and the electric vehicle is connected to the charging pile, the electric vehicle may discharge to the power grid if a self-test of the electric vehicle shows the electric vehicle has no fault.

Figure 6:
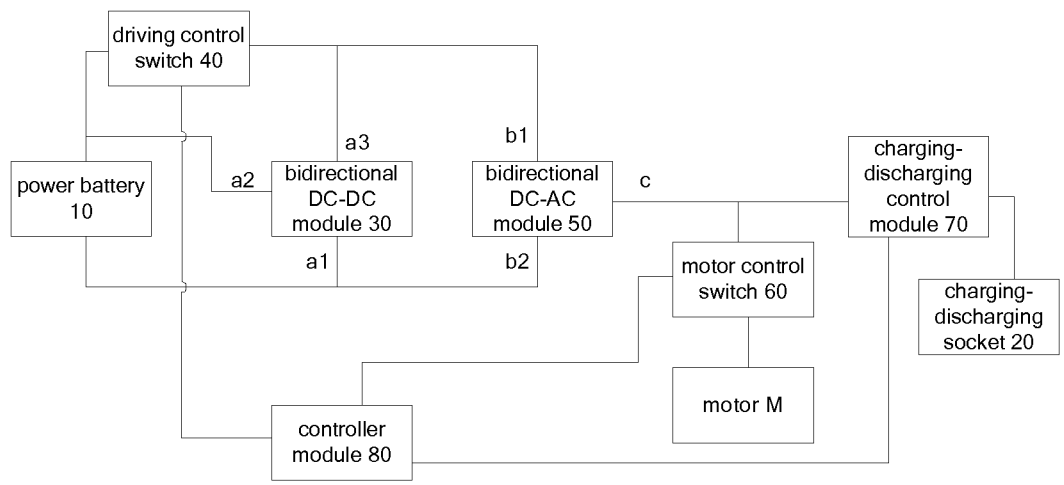
FIG. 6 is a block diagram of a power system for an electric vehicle.

FIG. 6 is a block diagram of a power system for an electric vehicle.

The power system for the electric vehicle according to an embodiment of the present disclosure includes a power battery 10, a charging-discharging socket 20, a bidirectional DC-DC module 30, a driving control switch 40, a bidirectional DC-AC module 50, a motor control switch 60, a charging-discharging control module 70 and a controller module 80. In some embodiments of the present disclosure, the external discharging circuit in the high-voltage distribution box refers to the charging-discharging control module 70, the bidirectional DC-DC module 30 and the bidirectional DC-AC module 50. When the power system is controlled to be at an external discharging state, the external discharging circuit may externally discharge.

The bidirectional DC-DC module 30 has a first DC terminal a1 connected with a first terminal of the power battery 10, and a second DC terminal a2 connected with a second terminal of the power battery 10. The first DC terminal a1 is a common DC terminal for an input to and an output from the bidirectional DC-DC module 30. The driving control switch 40 has a first terminal connected with the second terminal of the power battery 10, and a second terminal connected with a third DC terminal a3 of the bidirectional DC-DC module 30. The bidirectional DC-AC module 50 has a first DC terminal b1 connected with the second terminal of the driving control switch 40, and a second DC terminal b2 connected with the first terminal of the power battery 10. The motor control switch 60 has a first terminal connected with an AC terminal c of the bidirectional DC-AC module 50, and a second terminal connected with a motor M. The charging-discharging control module 70 has a first terminal connected with the AC terminal c of the bidirectional DC-AC module 50, and a second terminal connected with the charging-discharging socket 20. The controller module 80 is connected with the driving control switch 40, the motor control switch 60 and the charging-discharging control module 70 respectively, and configured to control the driving control switch 40, the motor control switch 60 and the charging-discharging control module 70 according to a current operation mode of the power system.

Further, the current operation mode of the power system may include a driving mode and a charge-discharge mode. When the current operation mode of the power system is the driving mode, the controller module 80 controls the driving control switch 40 to turn on in order to stop the bidirectional DC-DC module 30, controls the motor control switch 60 to turn on to drive the motor M normally, and controls the charging-discharging control module 70 to turn off. It should be noted that, although in some embodiments, the motor control switch 60 includes three switches connected with a three-phase input of the motor, in other embodiments, the motor control switch 60 may also include two switches connected with a two-phase input of the motor, or even one switch, provided that the control on the motor may be realized. Therefore, other embodiments will not be described in detail herein. When the current operation mode of the power system is the charge-discharge mode, the controller module 80 controls the driving control switch 40 to turn off to start the bidirectional DC-DC module 30, controls the motor control switch 60 to turn off to remove the motor M, and controls the charging-discharging control module 70 to turn on in such a way that an external power source may charge the power battery 10 normally. The first DC terminal a1 and the third DC terminal a3 of the bidirectional DC-DC module 30 are connected with a positive terminal and a negative terminal of a DC bus respectively.

Figure 7:
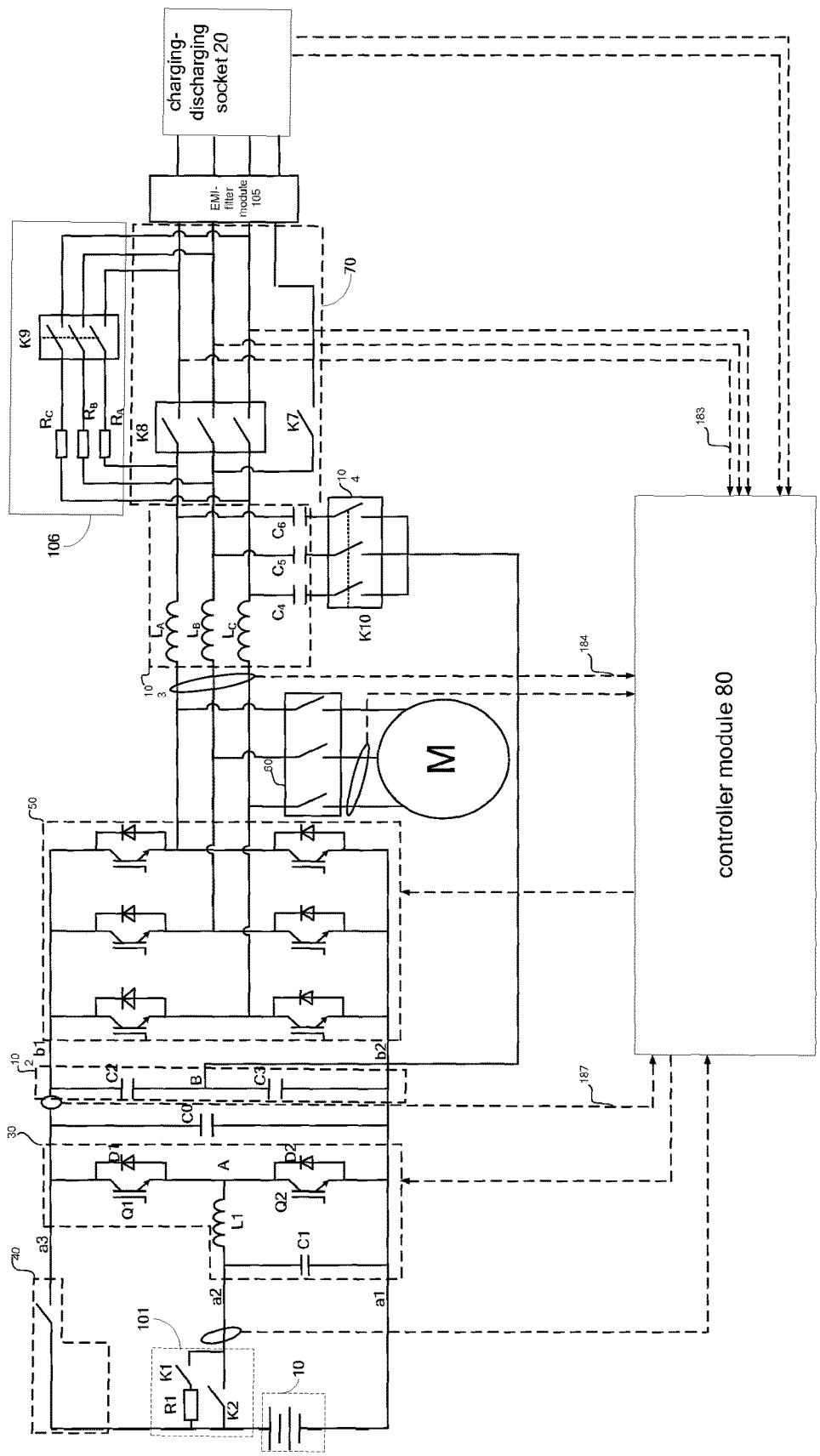
FIG. 7 is a topological diagram of a power system for an electric vehicle.

FIG. 7 is a topological diagram of a power system for an electric vehicle.

As shown in FIG. 7, the power system for the electric vehicle further includes a first pre-charging control module 101. The first pre-charging control module 101 has a first terminal connected with the second terminal of the power battery 10, and a second terminal connected with the second DC terminal a2 of the bidirectional DC-DC module 30, and the first pre-charging control module 101 is configured to pre-charge a capacitor C1 in the bidirectional DC-DC module 30 and a bus capacitor C0 connected between the first DC terminal a1 and the third DC terminal a3 of the bidirectional DC-DC module 30. The first pre-charging control module 101 includes a first switch K1, a first resistor R1 and a second switch K2. The first switch K1 has a first terminal connected with a first terminal of the first resistor R1 and a second terminal connected with the second DC terminal a2 of the bidirectional DC-DC module 30. The first resistor R1 has a second terminal connected with the second terminal of the power battery 10. The second switch K2 is connected in parallel with a circuit consisting of the first resistor R1 and the first switch K1 which are connected in series. When the power system is powered on, the controller module 80 controls the first switch K1 to turn on to pre-charge the capacitor C1 in the bidirectional DC-DC module 30 and the bus capacitor C0; and when a voltage across the bus capacitor C0 is a predetermined multiple of a voltage of the power battery 10, the controller module 80 controls the first switch K1 to turn off and controls the second switch K2 to turn on.

As shown in FIG. 7, the bidirectional DC-DC module 30 further includes a first switching transistor Q1, a second switching transistor Q2, a first diode D1, a second diode D2, a first inductor L1 and a first capacitor C1. The first switching transistor Q1 and the second switching transistor Q2 are connected in series to form a circuit, and said circuit is connected between the first DC terminal a1 and the third DC terminal a3 of the bidirectional DC-DC module 30. The first switching transistor Q1 and the second switching transistor Q2 are controlled by the controller module 80. A first node A is defined between the first switching transistor Q1 and the second switching transistor Q2. The first diode D1 is connected with the first switching transistor Q1 in inverse-parallel. The second diode D2 is connected with the second switching transistor Q2 in inverse-parallel. The first inductor L1 has a first terminal connected with the first node A, and a second terminal connected with the second terminal of the power battery 10. The first capacitor C1 has a first terminal connected with the second terminal of the first inductor L1, and a second terminal connected with the first terminal of the power battery 10.

Moreover, as shown in FIG. 7, the power system for the electric vehicle further includes a leakage current reducing module 102. The leakage current reducing module 102 is connected between the first DC terminal a1 and the third DC terminal a3 of the bidirectional DC-DC module 30. Specifically, the leakage current reducing module 102 includes a second capacitor C2 and a third capacitor C3. The second capacitor C2 has a first terminal connected with a first terminal of the third capacitor C3, and a second terminal connected with the first DC terminal a1 of the bidirectional DC-DC module 30, the third capacitor C3 has a second terminal connected with the third DC terminal a3 of the bidirectional DC-DC module 30, and a second node B is defined between the second capacitor C2 and the third capacitor C3.

Generally, a leakage current is large in an inverter and grid system without transformer isolation. Therefore, with the power system according to embodiments of the present disclosure, the leakage current reducing module 102 is connected between the positive terminal and the negative terminal of the DC bus, thus reducing the leakage current effectively. The leakage current reducing module 102 includes two capacitors C2 and C3 of the same type, the capacitor C2 is connected between the negative terminal of the DC bus and a three-phase AC neutral point potential, the capacitor C3 is connected between the positive terminal of the DC bus and the three-phase AC neutral point potential, and a high-frequency current may be fed back to a DC side when the power system operates, thus effectively reducing a high-frequency leakage current generated when the power system operates.

In one embodiment, as shown in FIG. 7, the power system for the electric vehicle further includes a filtering module 103, a filtering control module 104, an EMI-filter module 105 and a second pre-charging control module 106.

The filtering module 103 is connected between the bidirectional DC-AC module 50 and the charging-discharging control module 70. Specifically, as shown in FIG. 7, the filtering module 103 includes inductors $L_A$, $L_B$, $L_C$ and capacitors C4, C5, C6, and the bidirectional DC-AC module 50 may include six IGBTs (insulated gate bipolar transistor), a connection point between an upper IGBT and a lower IGBT is connected respectively with the filtering module 103 and the motor control switch 60 via a power bus.

As shown in FIG. 7, the filtering control module 104 is connected between the second node B and the filtering module 103, and controlled by the controller module 80. When the current operation mode of the power system is the driving mode, the controller module 80 controls the filtering control module 104 to turn off. The filtering control module 104 may be a capacitor switching relay, and includes a contactor K10. The EMI-filter module 105 is connected between the charging-discharging socket 20 and the charging-discharging control module 70. It should be noted that, the position of the contactor K10 in FIG. 5 is merely exemplary. In other embodiments, the contactor K10 may be located at other positions, provided that the filtering module 103 may be turned off using the contactor K10. For example, in another embodiment, the contactor K10 may also be connected between the bidirectional DC-AC module 50 and the filtering module 103.

The second pre-charging control module 106 is connected in parallel with the charging-discharging control module 70 and configured to pre-charge capacitors C4, C5, C6 In the filtering module 103. The second pre-charging control module 106 includes three resistors $R_A$, $R_B$, $R_C$ connected in series and a three-phase pre-charging switch K9.

In one embodiment, as shown in FIG. 7, the charging-discharging control module 70 further includes a three-phase switch K8 and/or a single-phase switch K7 configured to implement a three-phase charging-discharging or a single-phase charging-discharging.

In other words, when the power system is powered on, the controller module 80 controls the first switch K1 to turn on to pre-charge the first capacitor C1 in the bidirectional DC-DC module 30 and the bus capacitor C0; and when the voltage across the bus capacitor C0 is a predetermined multiple of the voltage of the power battery 10, the controller module 80 controls the first switch K1 to turn off and controls the second switch K2 to turn on. In this way, the bidirectional DC-DC module 30 and the large-capacity bus capacitor C0 directly connected between power buses (i.e. DC buses) constitute main components for implementing a battery low-temperature activation technology, which is adapted to transfer the electric energy of the power battery 10 to the large-capacity bus capacitor C0 via the bidirectional DC-DC module 30, and to transfer the electric energy stored in the large-capacity bus capacitor C0 to the power battery 10 via the bidirectional DC-DC module 30 (i.e. when charging the power battery 10) after an electric quantity of the bus capacitor C0 reaches a predetermined value. Therefore, the charging and discharging cycle of the power battery 10 makes the temperature of the power battery 10 increase to an optimum operation temperature range.

When the current operation mode of the power system is the driving mode, the controller module 80 controls the driving control switch 40 to turn on to stop the bidirectional DC-DC module 30, controls the motor control switch 60 to turn on to drive the motor M normally, and controls the charging-discharging control module 70 to turn off. It should be noted that, although in some embodiments, the motor control switch 60 includes three switches connected with a three-phase input of the motor, in other embodiments, the motor control switch 60 may also include two switches connected with a two-phase input of the motor, or even one switch, provided that the control on the motor may be realized. Therefore, other embodiments will not be described in detail herein. In this way, a DC from the power battery 10 is inverted into an AC by means of the bidirectional DC-AC module 50, and the AC is transmitted to the motor M. The operation of the motor M can be controlled by a revolving transformer decoder technology and a space vector pulse width modulation (SVPWM) control algorithm.

When the current operation mode of the power system is the charge-discharge mode, the controller module 80 controls the driving control switch 40 to turn off to start the bidirectional DC-DC module 30, controls the motor control switch 60 to turn off to remove the motor M, and controls the charging-discharging control module 70 to turn on in such a way that an external power source such as a three-phase power source or a single-phase power source may charge the power battery 10 via the charging-discharging socket 20 normally. In other words, by detecting a charge connection signal, an AC grid electric system and relevant information on whole vehicle battery management, a controllable rectification function may be performed be means of the bidirectional DC-AC module 50, and the in-vehicle power battery 10 may be charged by the single-phase power source and/or the three-phase power source via the bidirectional DC-DC module 30.

With the power system for the electric vehicle according to embodiments of the present disclosure, the electric vehicle can be charged under a high power by means of a civil or industrial AC grid, such that a user may perform the charging efficiently, promptly, anytime and anywhere, thus saving a charging time. Moreover, a constant-voltage control device or a constant-current control device is not required, thus saving space and cost and having a wide battery operation voltage range.

Figure 8:
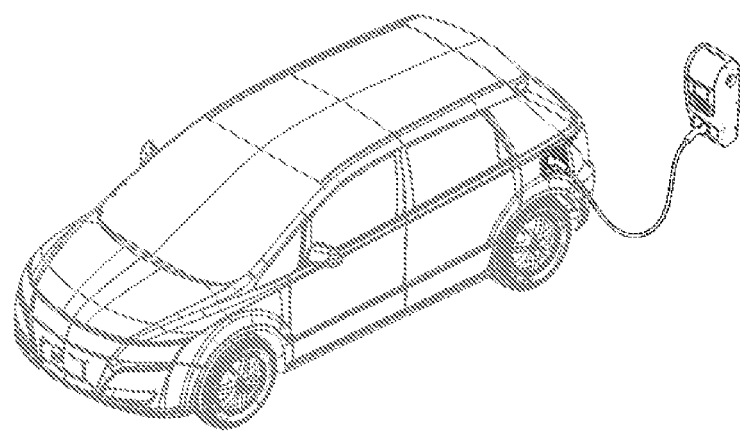
FIG. 8 is a schematic view of electric vehicles showing V-to-G (an electric vehicle discharging to a power grid)

FIG. 8 is a schematic view of electric vehicles showing V-to-G.

As shown in FIG. 8, the schematic view of electric vehicles showing V-to-G includes electric vehicles and a V-to-G discharging connection device.

Specifically, the V-to-G discharging connection device is mainly used to connect the electric vehicle and power grid equipment. An AC charging gun is provided at a first terminal of the V-to-G discharging connection device (that is, the first terminal is connected with the electric vehicle) and the power grid equipment meeting a national standard is provided at a second terminal of the V-to-G discharging connection device (that is, the second terminal is connected with the power grid equipment).

Furthermore, the V-to-G means that the electric vehicle may output AC to the power grid. For example, electric vehicles sold in Chinese Mainland may supply the power grid with a three-phase AC of 380V/50 Hz with a maximum output current of 63 A.

A process of the V-to-G may include a preparation period, a discharging period and a discharging finish period.

With the V-to-G solution, a motor driving controller is further expanded in function of inverting the DC into the AC. The improved electric vehicle may discharge to the power grid, and may store the power energy generated by the power grid during a power consumption low-peak time. Moreover, a utilization ratio of the power battery of the electric vehicle may be improved, and a use range of the electric vehicle may be extended. If a service of discharging to the power grid may be charged, a user providing the service may gain earnings from an electricity price difference between day and night.

A process of the V-to-G may include a preparation period, a discharging period and a discharging finish period.

Figure 9:
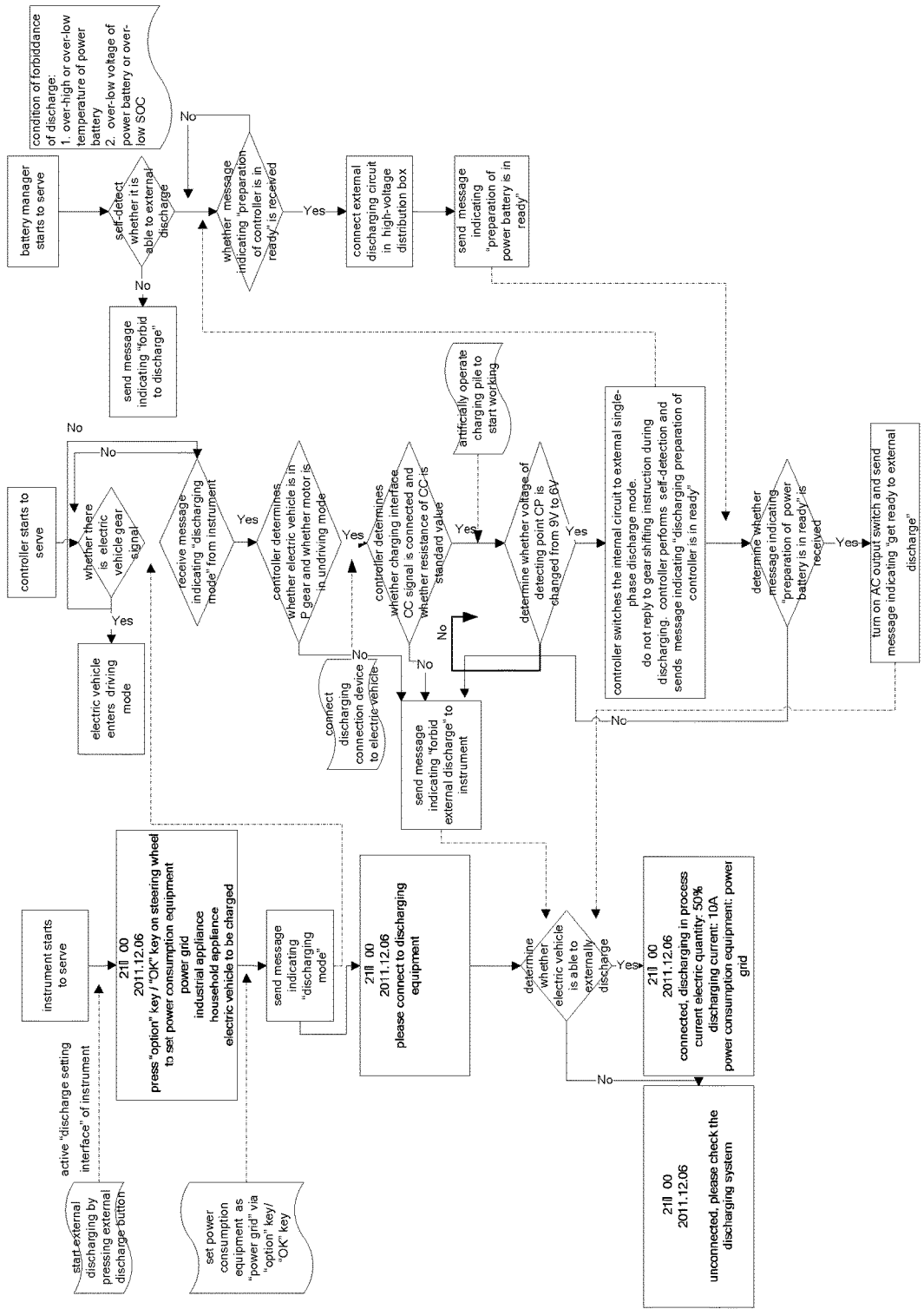
FIG. 9 is a flow chart illustrating operations of modules during a V-to-G discharging preparation period.
Figure 10:
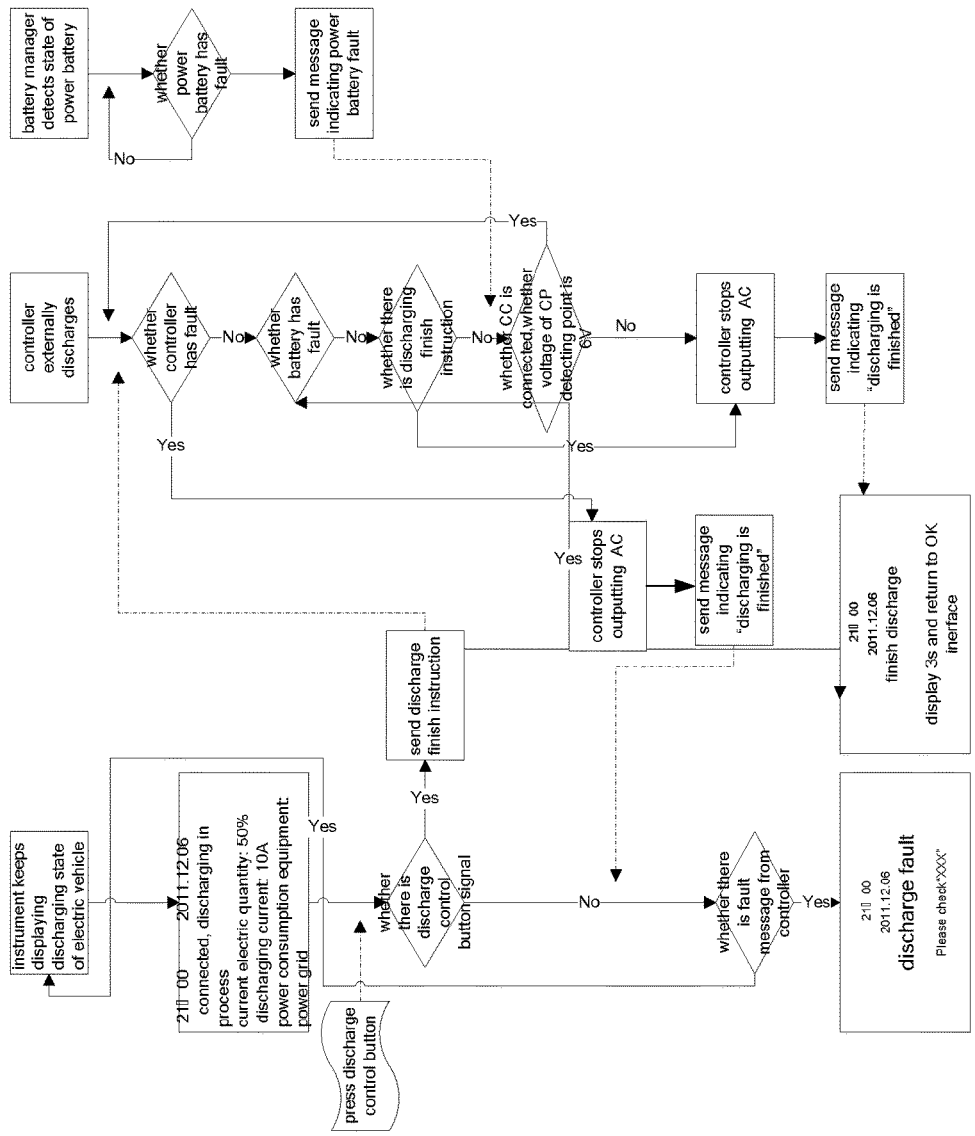
FIG. 10 is a flow chart illustrating operations of modules during a V-to-G discharging period and a V-to-G discharging finish period.

FIG. 9 is a flow chart illustrating operations of modules during the V-to-G discharging preparation period. FIG. 10 is a flow chart illustrating operations of modules during the V-to-G discharging period and the V-to-G discharging finish period.

FIG. 9 is a flow chart showing operations of modules during the V-to-G discharging preparation period. During the V-to-G discharging preparation period, specifically, when the electric vehicle is in OK gear with P gear, the instrument starts to serve. A "discharge setting interface" is activated by pressing an external discharge button on a panel of the instrument, and the power consumption equipment may be set as "power grid" via an "option" key and an "OK" key on a steering wheel, in which the power consumption equipment may further include an "industrial appliance", "household appliance" and "electric vehicle to be charged". After the discharging mode is set as "discharge to power grid", the instrument sends a message indicating "discharging mode" to inform the controller and popups a prompt "please connect to discharging equipment". If it is determined that the electric vehicle is able to externally discharge, a prompt is popuped, which includes a connecting state, a current electric quality, a discharging current and the power consumption equipment, for example, connected, discharging in process; the current electric quality: 50%; the discharging current: 10A; the power consumption equipment: power grid. If it is determined that the electric vehicle is unable to externally discharge, a prompt is popuped indicating unconnected, please check the discharging system.

Furthermore, when the controller is in service, it is first determined whether there is an electric vehicle gear signal, if yes, the electric vehicle enters the driving mode; and if no, the controller detects a CC signal to determine whether the charging gun is connected to the vehicle after receiving the message indicating "discharging mode" from the instrument. Specifically, it is determined whether the electric vehicle is in P gear and whether the motor is in undriving mode. If the electric vehicle is not in P gear and the motor is in undriving mode, a message indicating "forbid external discharge" is sent to the instrument. If the electric vehicle is in P gear and the motor is in undriving mode, the controller needs to determine whether a charging interface CC signal is connected and whether a resistance of CC is a standard value. If the CC signal is not detected and the resistance of CC is not the standard value, a message indicating "forbid external discharge" is sent to the instrument. If the CC signal is detected and the resistance of CC is the standard value, the controller detects whether a CP signal has a PWM wave with an amplitude of 9V at a detecting point 2. If it is detected that there is the PWM wave, a switch S2 is turned on and an internal circuit of the controller is switched to an external three-phase discharge mode. A gear shifting instruction is not replied during the discharging. The controller performs a self-detection, and if there is no fault, the controller sends a message indicating "discharging preparation of the controller is in ready". It is determined whether a message indicating "preparation of the power battery is in ready" is received, and if yes, the message indicating "preparation of the controller is in ready" is sent, an AC output switch is turned on and a message indicating "get ready to external discharge" is sent. If the message indicating "preparation of the power battery is in ready" is not received, the message indicating "forbid external discharge" is sent to the instrument.

When it starts to work, the battery manager first self-detects whether it is able to external discharge, and if no, a message indicating "forbid to discharge" is sent. A condition of forbiddance of discharge includes any one of an over-high temperature of the power battery, an over-low temperature of the power battery, an over-low voltage of the power battery and an over-low SOC. When receiving the message indicating "preparation of the controller is in ready", the battery manager controls the external discharging circuit in the high-voltage distribution box to be connected and sends the message indicating "preparation of the power battery is in ready".

Furthermore, after receiving the message indicating "preparation of the power battery is in ready", the controller connects an external output and gets ready to work, that is, the AC is supplied to the power grid, and a message indicating "start to discharge" is sent.

FIG. 10 is a flow chart illustrating operations of modules during the V-to-G discharging period and the V-to-G discharging finish period.

During the V-to-G discharging period and the V-to-G discharging finish period, specifically, the instrument keeps displaying the discharging state of the electric vehicle, the controller keeps detecting whether there is a message indicating "the discharging is finished" from the instrument, whether the controller has a fault, whether there is a CC connecting signal, whether the voltage of the detecting point CP is 6V, whether the power battery has a fault, and the battery manager keeps detecting the state of the power battery.

The controller stops externally outputting the AC if any of following cases occurs. When receiving the message indicating "the discharging is finished" from the instrument, (that is, a power generation switch on the instrument is triggered to stop external discharging) the controller stops externally outputting the AC and sends the message indicating "the discharging is finished", and after receiving the message indicating "the discharging is finished", the battery manager switches an internal circuit in the high-voltage distribution to reset the electric vehicle in OK gear. When receiving a message indicating "a battery system fault" sent from the battery manager, the controller stops externally outputting the AC, and the instrument displays the fault. The battery system fault includes but is not limited to over-low temperature of the power battery, over-high temperature of the power battery and over-low voltage of the power battery. When it is detected the controller has a fault on itself, the controller stops externally outputting the AC and sends a message indicating "a controller fault", the instrument receives the message indicating "the controller fault" and displays the fault, and the battery manager switches to a corresponding state according to the fault.

Furthermore, during the external discharging, the controller stops externally outputting the AC if any of following cases occurs. When the controller detected a disconnection of the CC connecting signal, the controller stops externally outputting the AC and sends a message indicating "connection fault". When the controller detects that the CP connecting signal is changed from 6V to 9V, which indicates that the charging pile is disconnected from the power grid artificially, the controller stops externally outputting the AC and sends the message indicating "the discharging is finished", and after receiving the message indicating "the discharging is finished", the battery manager switches an internal circuit in the high-voltage distribution to reset the electric vehicle in OK gear.

With the discharging apparatus for the electric vehicle according to embodiments of the present disclosure, when the electric vehicle is in OK gear, after an external discharging mode is set in the instrument and the electric vehicle is connected to the charging pile, the electric vehicle may discharge to the power grid if a self-test of the electric vehicle shows the electric vehicle has no fault. With the electric vehicle, redundant power energy is stored during power consumption low-peak time and is discharged to the power grid during power consumption high-peak time. The discharging apparatus for an electric vehicle according to embodiments of the present disclosure has advantages of simplicity, high efficiency and applicability.

The present disclosure further provides an electric vehicle. The electric vehicle includes the discharging apparatus 100 for the electric vehicle according to embodiments of the present disclosure.

With the electric vehicle according to embodiments of the present disclosure, when the electric vehicle is in OK gear, after an external discharging mode is set in the instrument and the electric vehicle is connected to the charging pile, the electric vehicle may discharge to the power grid if a self-test of the electric vehicle shows the electric vehicle has no fault. With the electric vehicle, redundant power energy is stored during power consumption low-peak time and is discharged to the power grid during power consumption high-peak time. The discharging apparatus for an electric vehicle according to embodiments of the present disclosure has advantages of simplicity, high efficiency and applicability.

Any procedure or method described in the flow charts or described in any other way herein may be understood to comprise one or more modules, portions or parts for storing executable codes that realize particular logic functions or procedures. Moreover, advantageous embodiments of the present disclosure comprises other implementations in which the order of execution is different from that which is depicted or discussed, including executing functions in a substantially simultaneous manner or in an opposite order according to the related functions. This should be understood by those skilled in the art to which embodiments of the present disclosure belong.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A discharging apparatus for an electric vehicle, comprising:
   an AC charging interface, connected with a charging pile and configured to transmit AC to a power grid via the charging pile, the charging pile being connected with the power grid;
   an instrument, configured to send a discharging preparation instruction after receiving a trigger signal;
   a controller, configured to communicate with the instrument and to detect whether the AC charging interface is connected with the charging pile after receiving the discharging preparation instruction, and to detect whether there is a PWM wave with a predetermined voltage in the controller, and if there is a PWM wave with a predetermined voltage in the controller, to switch to an external discharging mode;
   a battery manager, configured to communicate with the controller and to control an external discharging circuit in a high-voltage distribution box of the electric vehicle to be connected after the controller switches to the external discharging mode;
a power battery, connected with the high-voltage distribution box,
wherein the controller is configured to detect whether an electric quantity of the electric vehicle is greater than a predetermined value, and if yes, to convert a DC provided by the external discharging circuit into the AC and to output the AC to the AC charging interface so as to discharge to the power grid;
the external discharging circuit comprises:
    a bidirectional DC-DC module connected to the power battery;
    a bidirectional DC-AC module connected to the power battery, the bidirectional DC-DC module and a driving control switch connected between the power battery and the bidirectional DC-AC module; and
    a charging-discharging control module connected between the bidirectional DC-AC module and the AC charging interface to provide the AC to the AC charging interface after the controller switches to the external discharging mode, the charging-discharging control module and the driving control switch are controlled by a controller module; and
the controller is further configured to detect whether the electric vehicle is currently in a P gear after it is determined that the AC charging interface is connected with the charging pile, and if yes, the controller switches to the external discharging mode, wherein when the controller switches to the external discharging mode, the controller is further configured to:
control the driving control switch to turn off to start the bidirectional DC-DC module:
control a motor control switch to turn off to remove a motor; and
control the charging-discharging control module to turn on.

2. The discharging apparatus for an electric vehicle according to claim 1, wherein the instrument and the controller communicate via a CAN bus of a local area network of the controller, and the controller and the battery manager communicate via the CAN bus.

3. The discharging apparatus for an electric vehicle according to claim 1, wherein the controller is further configured to detect in real-time whether an internal circuit of the controller has a fault and to detect in real-time whether the electric vehicle has a fault during discharging.

4. The discharging apparatus for an electric vehicle according to claim 3, wherein the controller is further configured to stop outputting the AC if it is determined that the internal circuit has a fault and/or the electric vehicle has a fault.

5. The discharging apparatus for an electric vehicle according to claim 1, wherein the battery manager is further configured to detect in real-time a current electric quantity of the power battery and to detect in real-time whether the power battery has a fault, if it is determined the power battery has a fault, the battery manager sends a battery fault instruction to the controller, and the controller stops outputting the AC after receiving the battery fault instruction.

6. The discharging apparatus for an electric vehicle according to claim 1, wherein the controller is further configured to stop outputting the AC after receiving a discharging finish instruction from the instrument.

7. The discharging apparatus for an electric vehicle according to claim 1, wherein the controller is further configured to detect a current discharging current in real-time.

8. The discharging apparatus for an electric vehicle according to claim 1, wherein the controller is further configured to stop outputting the AC if it is determined that the charging pile is disconnected with the AC charging interface or the charging pile is disconnected with the power grid.

9. An electric vehicle, comprising a discharging apparatus, the discharging apparatus comprising:
an AC charging interface, connected with a charging pile and configured to transmit AC to a power grid via the charging pile, the charging pile being connected with the power grid;
an instrument, configured to send a discharging preparation instruction after receiving a trigger signal;
a controller, configured to communicate with the instrument and to detect whether the AC charging interface is connected with the charging pile after receiving the discharging preparation instruction, and to detect whether there is a PWM wave with a predetermined voltage in the controller, and if there is a PWM wave with a predetermined voltage in the controller, to switch to an external discharging mode;
a battery manager, configured to communicate with the controller and to control an external discharging circuit in a high-voltage distribution box of the electric vehicle to be connected after the controller switches to the external discharging mode;
a power battery, connected with the high-voltage distribution box,
wherein the controller is configured to detect whether an electric quantity of the electric vehicle is greater than a predetermined value, and if yes, to convert a DC provided by the external discharging circuit into the AC and to output the AC to the AC charging interface so as to discharge to the power grid;
the external discharging circuit comprises:
    a bidirectional DC-DC module connected to the power battery;
    a bidirectional DC-AC module connected to the power battery, the bidirectional DC-DC module and a driving control switch connected between the power battery and the bidirectional DC-AC module; and
    a charging-discharging control module connected between the bidirectional DC-AC module and the AC charging interface to provide the AC to the AC charging interface after the controller switches to the external discharging mode, the charging-discharging control module and the driving control switch are controlled by a controller module; and
the controller is further configured to detect whether the electric vehicle is currently in a P gear after it is determined that the AC charging interface is connected with the charging pile, and if yes, the controller switches to the external discharging mode, wherein when the controller switches to the external discharging mode, the controller is further configured to:
control the driving control switch to turn off to start the bidirectional DC-DC module:
control a motor control switch to turn off to remove a motor; and
control the charging-discharging control module to turn on.

10. The electric vehicle according to claim 9, wherein the instrument and the controller communicate via a CAN bus of a local area network of the controller, and the controller and the battery manager communicate via the CAN bus.

11. The electric vehicle according to claim 9, wherein the controller is further configured to detect in real-time whether an internal circuit of the controller has a fault and to detect in real-time whether the electric vehicle has a fault during discharging.

12. The electric vehicle according to claim 11, wherein the controller is further configured to stop outputting the AC if it is determined that the internal circuit has a fault and/or the electric vehicle has a fault.

13. The electric vehicle according to claim 9, wherein the battery manager is further configured to detect in real-time a current electric quantity of the power battery and to detect in real-time whether the power battery has a fault, if it is determined the power battery has a fault, the battery manager sends a battery fault instruction to the controller, and the controller stops outputting the AC after receiving the battery fault instruction.

14. The electric vehicle according to claim 9, wherein the controller is further configured to stop outputting the AC after receiving a discharging finish instruction from the instrument.

15. The electric vehicle according to claim 9, wherein the controller is further configured to detect a current discharging current in real-time.

16. The electric vehicle according to claim 9, wherein the controller is further configured to stop outputting the AC if it is determined that the charging pile is disconnected with the AC charging interface or the charging pile is disconnected with the power grid.

* * * * *